(12) United States Patent
Challener et al.

(10) Patent No.: US 8,151,262 B2
(45) Date of Patent: Apr. 3, 2012

(54) SYSTEM AND METHOD FOR REPORTING THE TRUSTED STATE OF A VIRTUAL MACHINE

(75) Inventors: David Carroll Challener, Raleigh, NC (US); Mark Charles Davis, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1404 days.

(21) Appl. No.: 11/693,927

(22) Filed: Mar. 30, 2007

(65) Prior Publication Data

US 2008/0244569 A1 Oct. 2, 2008

(51) Int. Cl.
G06F 9/455 (2006.01)

(52) U.S. Cl. .............. 718/1; 713/2; 713/164; 726/12; 726/15; 726/19; 726/26

(58) Field of Classification Search .................. None
See application file for complete search history.

(56) References Cited

U.S. PATENT DOCUMENTS

| | | | |
|---|---|---|---|
| 7,085,933 B2* | 8/2006 | Challener et al. | 713/182 |
| 7,343,493 B2* | 3/2008 | Challener et al. | 713/193 |
| 7,552,419 B2* | 6/2009 | Zimmer et al. | 717/121 |
| 7,571,312 B2* | 8/2009 | Scarlata et al. | 713/155 |
| 7,653,819 B2* | 1/2010 | Bade et al. | 713/187 |
| 7,707,629 B2* | 4/2010 | Grawrock | 726/12 |
| 7,725,703 B2* | 5/2010 | Hunter et al. | 713/2 |
| 2003/0229802 A1* | 12/2003 | Challener et al. | 713/200 |
| 2005/0120219 A1* | 6/2005 | Munetoh et al. | 713/176 |
| 2005/0138370 A1* | 6/2005 | Goud et al. | 713/164 |
| 2006/0070066 A1* | 3/2006 | Grobman | 718/1 |
| 2006/0155988 A1 | 7/2006 | Hunter et al. | 713/164 |
| 2006/0212939 A1* | 9/2006 | England et al. | 726/22 |
| 2007/0042754 A1* | 2/2007 | Bajikar et al. | 455/411 |
| 2007/0136577 A1* | 6/2007 | Bade et al. | 713/164 |
| 2008/0126779 A1* | 5/2008 | Smith | 713/2 |
| 2008/0148064 A1* | 6/2008 | Challener et al. | 713/189 |
| 2008/0178176 A1* | 7/2008 | Berger et al. | 718/1 |
| 2008/0244292 A1* | 10/2008 | Kumar et al. | 713/323 |
| 2009/0169017 A1* | 7/2009 | Smith et al. | 380/278 |

OTHER PUBLICATIONS

Berger et al. "vTPM: Virtualizing the Trusted Platform Module: 15th USENIX Security Symposium", Sep. 2006.*
*TCG PC Client Specific TPM Interface Specification (TIS)*, ver. 1.20, Trusted Computing Group, Inc., Jul. 2005.
TCG Specification Architecture Overview, rev. 1.3. Trusted Computing Group, Inc., Mar. 2007.
TCG PC Specific Implementation Specification, ver. 1.1, Trusted Computing Group, Inc., Aug. 2005.
*TCG PC Client Specific Implementation Specification for Conventional BIOS*, ver. 1.20, Trusted Computing Group, Inc., Jul. 2005.

* cited by examiner

*Primary Examiner* — Emerson Puente
*Assistant Examiner* — Hiren Patel
(74) *Attorney, Agent, or Firm* — VanLeeuwen & VanLeeuwen; Carlos Munoz-Bustamant

(57) ABSTRACT

A system, method, and program product is provided that executes a start sequence of an information handling system that includes a hardware based TPM. Multiple PCRs are stored in the TPM and are initialized to a predetermined state when the start sequence commences. During execution of the start sequence, software modules, including a hypervisor, are loaded the system's memory. PCR values resulting from the loading of the software modules are calculated. The resulting PCR values are compared with expected PCR values. If the PCR values match the expected PCR values, then a virtual environment is created under the hypervisor. The virtual environment includes a VM and a virtual trust platform module (vTPM) that is used by the virtual machine to satisfy the virtual machines TPM requests.

20 Claims, 8 Drawing Sheets

SYSTEM AND METHOD FOR REPORTING THE TRUSTED STATE OF A VIRTUAL MACHINE

BACKGROUND OF THE INVENTION

1. Technical Field

The present invention relates to a system and method that reports the trusted state of a virtual machine running on a computer system. More particularly, the present invention relates to a system and method that uses a hypervisor to provide virtual trusted platform modules (vTPMs) to perform trust activities for the virtual machines.

2. Description of the Related Art

Modern computer systems often employs "hypervisors" that allow multiple virtual machines, such as operating systems, to run on the host computer system. A hypervisor, also known as a "virtual machine monitor," is a virtualization platform that provides an abstraction of hardware-based computer resources. The virtual machines (VMs) that run under the hypervisor run in a virtual environment where, from the point of view of the virtual machines, each virtual machine appears to occupy and control the entire computer system. The role of the hypervisor is to provide an interface to the higher level services, such hardware components. These hardware components can include a Trust Platform Module (TPM) which is a hardware module used to store secure information and provide cryptographic functions.

A TPM is a hardware chip embedded on the motherboard that can be used to authenticate a hardware device. Since each TPM chip is unique to a particular device, it is capable of performing platform authentication. It can be used to verify that the system seeking the access is the expected system.

A Trusted Platform Module offers facilities for secure generation of cryptographic keys, the abilities to limit the use of keys (to either signing/verification or encryption/decryption), as well as a hardware Random Number Generator. The TPM also performs functions of remote attestation, binding, and sealing. Remote attestation creates a theoretically unforgeable summary of the hardware, boot, and host O/S configuration of a computer, allowing a third party (such as a digital music store) to verify that the software has not been changed. Sealing encrypts data in such a way that it may be decrypted only in the exact same state (that is, it may be decrypted only on the computer it was encrypted running the same software). Binding encrypts data using the TPM Endorsement Key (a unique key embedded in the chip during the chip's production) or another 'trusted' key.

A challenge with using hypervisors and virtual machines in a computer system that includes a TPM is that the TPM is generally inaccessible from the virtual machines. One approach to this challenge is to use the hypervisor to pass requests from the virtual machines to the TPM and return the results. A challenge of this approach, however, is that, while the state of the system will different based upon the virtual machines that are running, these differences will not reflected in the hardware-based platform configuration registers (PCRs) maintained by the TPM.

SUMMARY

It has been discovered that the aforementioned challenges are resolved using a system, method and computer program product that executes a start sequence of an information handling system that includes a hardware based trust platform module (TPM). Multiple platform configuration registers (PCRs) are stored in the TPM and are initialized to a predetermined state when the start sequence commences. During execution of the start sequence, software modules, including a hypervisor, are loaded the system's memory. PCR values resulting from the loading of the software modules are calculated. The PCR values that result from loading the hypervisor are compared with expected PCR values. If the PCR values resulting from loading the hypervisor match the expected PCR values, then a virtual environment is created under the hypervisor. The virtual environment includes a virtual machine and a virtual trust platform module (vTPM) that is used by the virtual machine to satisfy the virtual machines TPM requests. On the other hand, if the PCR values resulting from loading the hypervisor do not match the expected PCR values, then the virtual environment is not created.

In one embodiment, the creation of the virtual trust platform module includes calculating additional PCR values resulting from loading the virtual machine. These additional PCR values are stored in virtual platform configuration registers that are included in the virtual trust platform module. In a further embodiment, the loading of the virtual machine includes comparing the additional PCR values that resulted from the loading of the hypervisor with the additional expected PCR values. If the additional PCR values that resulted from the loading of the virtual machine match the expected additional PCR values, then the virtual machine is executed by the processor, otherwise the virtual machine is not executed by the processor.

In one embodiment, the creation of the virtual trust platform module (vTPM) includes calculating, by the hypervisor, a virtual endorsement key (vEK), one or more virtual platform configuration registers (vPCRs), and a virtual AIK (vAIK) corresponding to the virtual machine. The vEK, vPCRs, and the vAIK are then stored in the virtual trust platform module.

In an additional embodiment, the virtual machine is executed by the processors. During execution, a TPM request is received at the hypervisor from the virtual machine. The hypervisor responds by retrieving data from the virtual trust management platform (vTPM) that corresponds to the TPM request, and the retrieved data is returned to the virtual machine. In a further embodiment, the hypervisor emulates a TPM function in order to satisfy the virtual machine's request. The emulation result in the data that is returned to the virtual machine.

In one embodiment, the creation of the virtual environment includes storing one or more migration rules corresponding to the virtual machine. In this embodiment, the hypervisor receives a request to migrate the virtual machine to a second system environment. The second system environment can be another information handling system connected via a computer network or another hypervisor either running on the same information handling system or on a different information handling system. The hypervisor receives a state from the requesting system environment and compares the system environment's state to the migration rules. If the requesting system environment's state satisfies the migration rules, then the virtual environment (including the virtual machine and the virtual trust management platform (vTPM)) is packaged and transmitting to the requesting system environment. On the other hand, if the requesting system environment's state does not satisfy the migration rules, then the request to migrate the virtual machine is denied.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
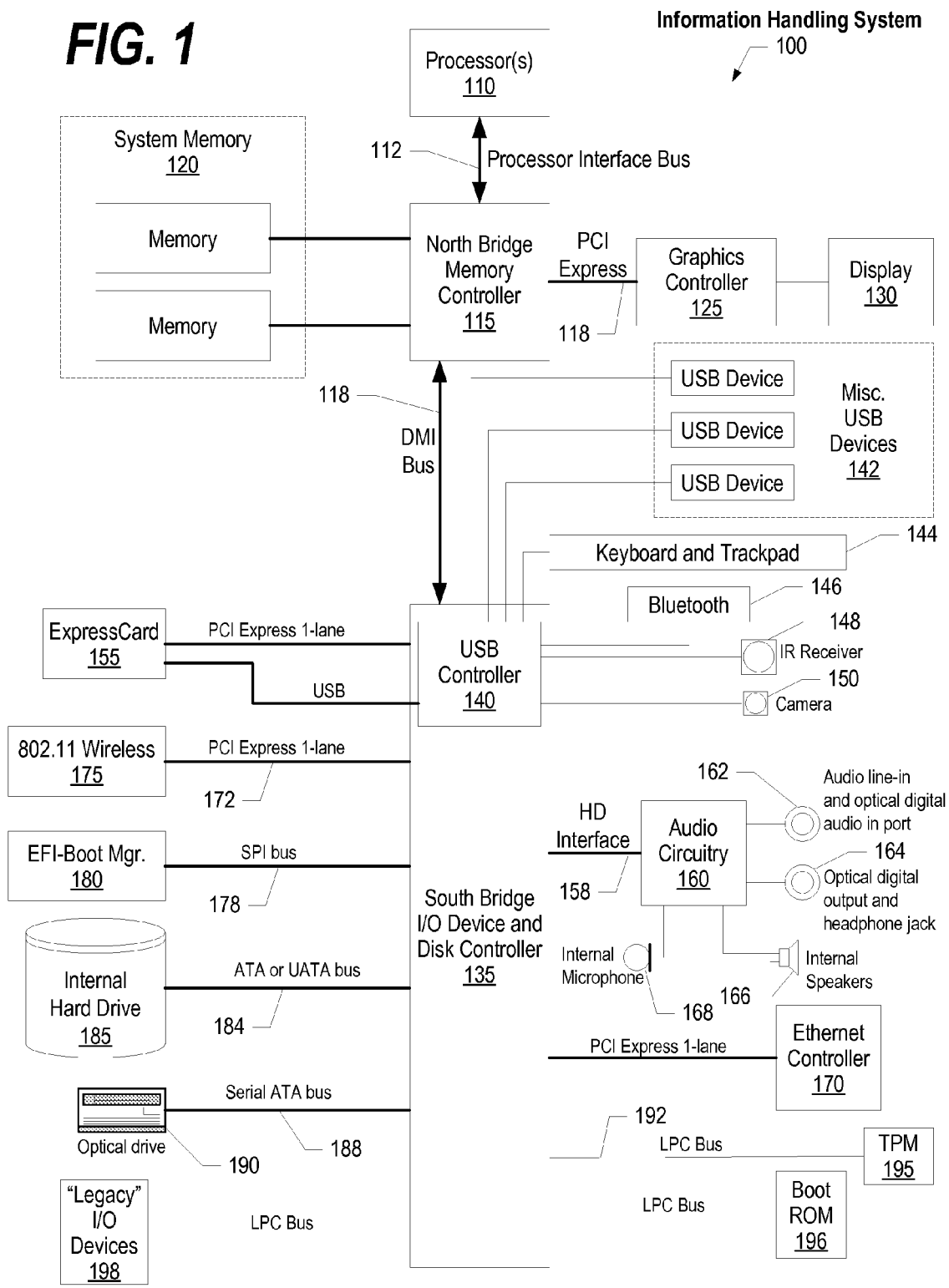
FIG. 1 is a block diagram of a data processing system in which the methods described herein can be implemented.
Figure 2:
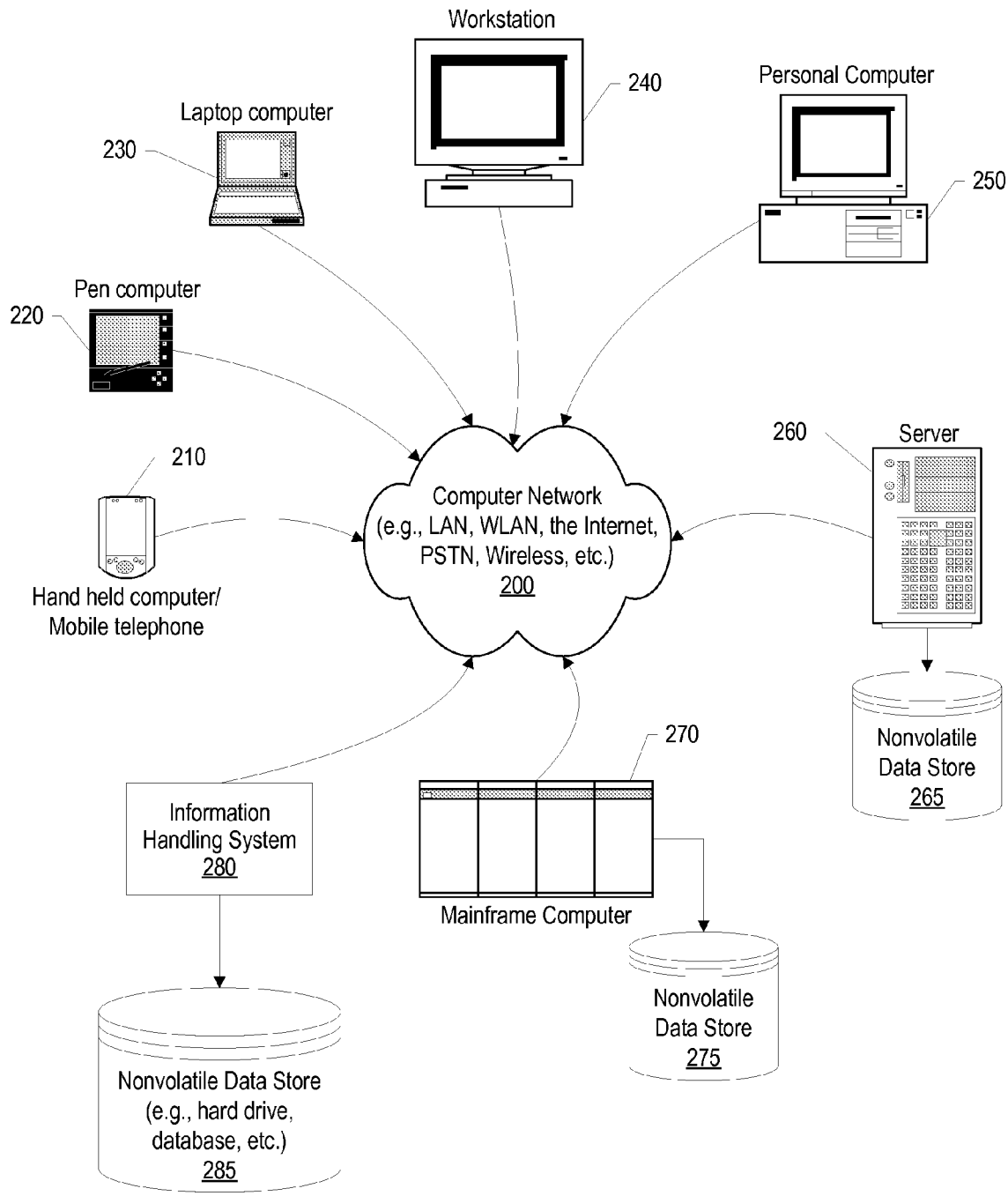
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera1) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
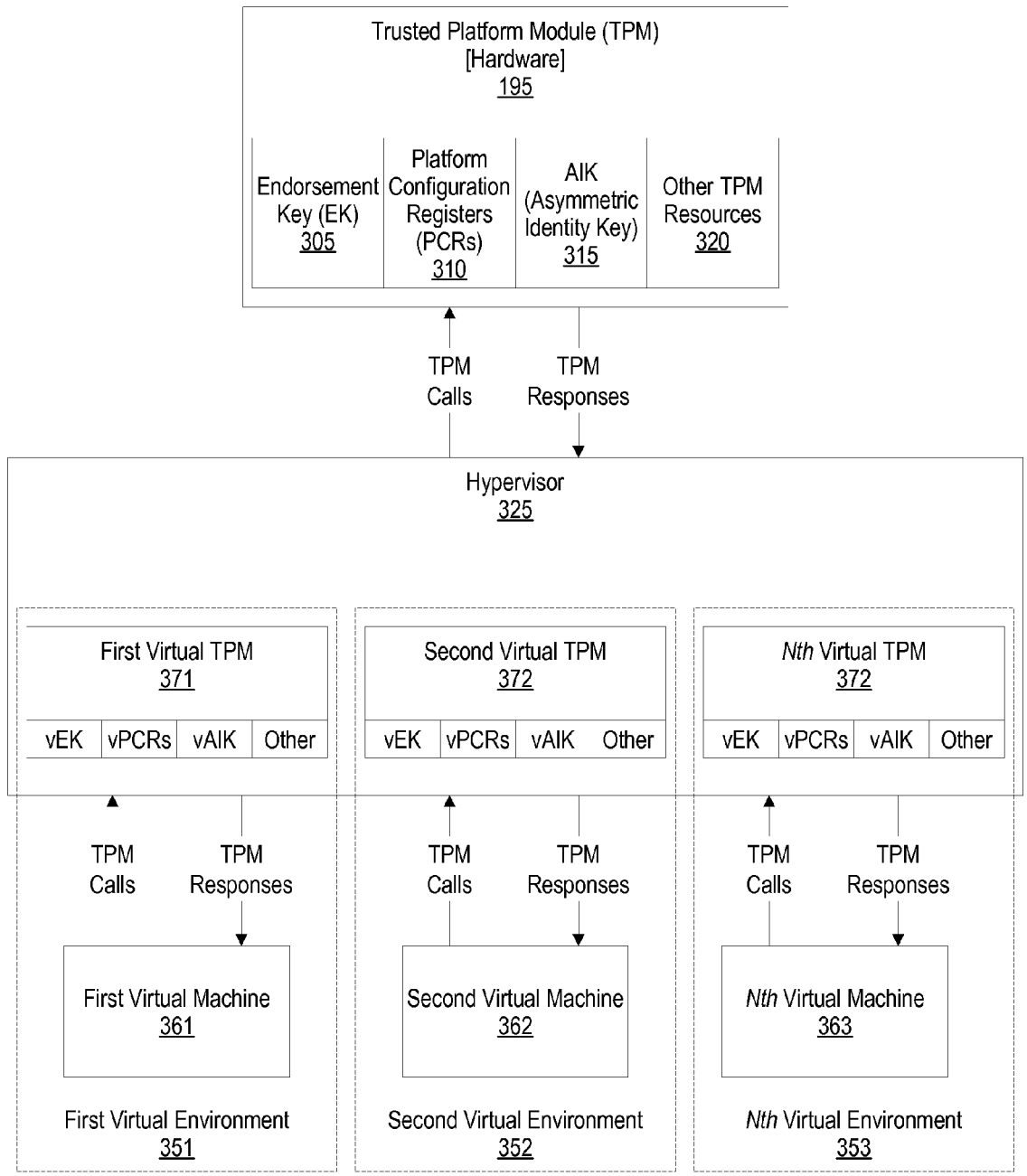
FIG. 3 is a block diagram of virtual environments, including virtual trust platform modules (vTPMs), provided by a hypervisor that interacts with the computer systems hardware-based trusted platform module (TPM)

FIG. 3 is a block diagram of virtual environments, including virtual trust platform modules (vTPMs), provided by a hypervisor that interacts with the computer systems hardware-based trusted platform module (TPM). Trusted platform module 195 provides a number of elements used in reporting the trusted state of the computer system as well as providing other cryptographic functions. Endorsement key (EK) 305 is a unique key that is embedded in TPM 195 when the TPM is manufactured and is often used to "bind" data. Binding encrypts data using Endorsement Key 305 or another "trusted" key. Platform configuration registers (PCRs) 310 within the TPM are shielded locations that contain a digest of integrity digests. A hash function, such as a SHA-1 (Secure Hash Algorithm) is used to compute a digest of various components and the resulting digest can be compared to the values in the PCRs to ascertain whether the software modules (e.g., BIOS code, hypervisor code, etc.) has been altered. AIK 315 is an identity key which is a special purpose signature key that is created by the TPM. The AIK is an asymmetric key. The private portion of the key is non-migratable and protected by the TPM. The public portion of an AIK is part of the AIK Credential. In one embodiment, an AIK is only created by the TPM Owner or a delegate authorized by the TPM Owner. The AIK can be used for platform authentication, platform attestation and certification of keys. Other TPM resources include resources such as a hardware-based random number generator (RNG), and other resources known by those skilled in the art to be available at a TPM.

During the startup sequence of the information handling system, hypervisor 325 is loaded and executed. The startup sequence includes a trusted boot which is a means to securely measure the boot history of the information handling system into PCR registers, from which they can be read. As components, such as the BIOS and hypervisor, are loaded, the system state is measured (e.g., using a hashing function such as the SHA-1 function) along the way. A component, such as hypervisor 325, can compare expected PCR values with actual PCR values to determine if the system is in a trusted boot state. TPM 195 includes a command called "SEAL" which allows data to be encrypted in such a way so that the TPM will only decrypt the data if the PCR values (which represent the history of the system's current boot sequence) matches certain expected values. The PCRs and the PCR values are stored with the encrypted data. In this manner, the PCRs and their values are cryptographically lined to the encrypted data. When a component, such as hypervisor 325, desires to unseal data, such as one of the virtual machines (361, 362, or 363) or one of the virtual TPMs (371, 372, or 373) that make up the virtual environments (351, 352, and 353), the component sends TPM 195 the encrypted data and the linked "expected" PCR values. The TPM checks whether the linked (expected) PCR values match the actual PCR values. If the values match, the key is released (e.g., the key used to decrypt one of the virtual machines (361, 362, or 363) or the key used to decrypt one of the virtual TPMs (371, 372, or 373)).

In FIG. 3, hypervisor 325 sets up various virtual environments (351, 352, and 353). For each virtual environment, hypervisor 325 sets up a virtual machine (361, 362, and 363) and a virtual trusted platform module (vTPMs 371, 372, and 373). Each of the virtual TPMs includes components similar to those in hardware-based TPM 195. Being virtual environments, the virtual machines do not have direct access of the hardware based TPM. Instead TPM calls made by the virtual machines are processed by hypervisor 325. Hypervisor maintains a virtual Endorsement Key (vEK), virtual PCRs (vPCRs), virtual Asymmetric Identity Keys (AIK), and other encrypted data for the various virtual machines. In addition, hypervisor 325 simulates cryptographic functions, such as random number generation, SEALing, etc., generally provided by the hardware-based TPM. In this manner, the virtual PCRs maintained for the various virtual machines can be different from one another because the PCRs represent the history of the system's boot sequence and, therefore, can be different based upon the specific virtual machines that have been loaded and executed. For example, if First Virtual Machine 361 is a first operating system and Second Virtual Machine 362 is a second operating system, the virtual PCRs maintained for the first virtual machine (vTPM 371) may be setup so that certain data is not made available if the second operating system has been loaded.

Figure 4:
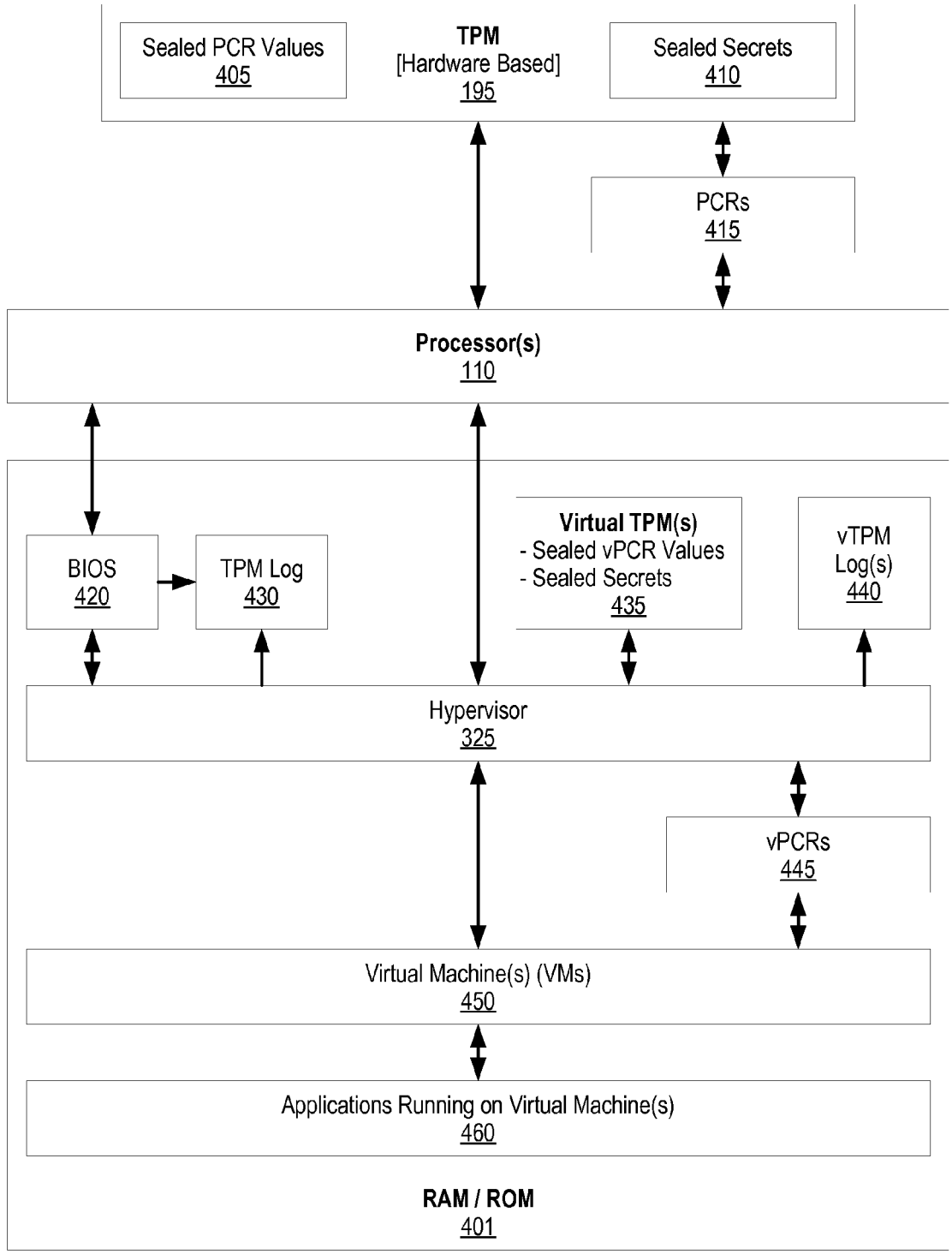
FIG. 4 is a block diagram depicting the interaction of components used to create the virtual environments shown in FIG. 3.

FIG. 4 is a block diagram depicting the interaction of components used to create the virtual environments shown in FIG. 3. TPM 195 is shown with sealed PCR values 405 and sealed secrets 410. Processors 110 communicate with TPM 195. In one embodiment, the TPM is connected to processors 110 via a low pin count (LPC) bus. During the startup sequence, processors 110 send the actual values representing the current boot states to TPM over the LPC bus as PCR values 415. When a component wishes to decrypt data, for example when BIOS 420 is loading hypervisor 325, if the hypervisor is sealed (encrypted), the BIOS sends the TPM the encrypted data (the encrypted hypervisor) along with the anticipated PCR values (PCR 415). TPM 195 receives the anticipated (expected) PCR values 415 and compares them with the sealed PCR values 405. If the values match, the TPM releases the key (such as the key used to decrypt the hypervisor code). A log of the TPM related activity is stored in TPM log 430. As shown, TPM log may be maintained by BIOS 420. In addition other processes, such as hypervisor 325 may be responsible for maintaining TPM log 430.

When hypervisor 325 is loaded and executed, it creates virtual trust platform modules (vTPMs) 435. As shown, the virtual TPMs include sealed virtual PCR values and sealed secrets used by virtual machines 450 that are executed and maintained by hypervisor 325. The virtual machines, such as operating systems, in turn run various applications 460. When a virtual machine requests a TPM function, the hypervisor simulates the hardware based TPM and returns results to the requesting virtual machine. As mentioned before, hypervisor 325 can maintain multiple virtual TPMs and each of these virtual TPMs can have different encrypted data, such as different sealed PCR values and different sealed secrets. For example, if one of the virtual machines 460 requests the unsealing of data, perhaps one of the applications 460, the virtual machine sends a request to the virtual TPM. The request includes the encrypted data (e.g., an encrypted application module) along with anticipated, or expected, PCR values 445. Hypervisor 325 simulates the TPM function by comparing the sealed vPCR values stored in the virtual TPM 435 for this virtual machine with the vPCR values provided by the virtual machine (vPCR 445). If the values match, the hypervisor (simulating the TPM function) returns the sealed data, such as an encryption key used to decrypt a software module that is being launched by the virtual machine.

BIOS 420, hypervisor 325, virtual machines 450, and applications 460 reside in the information handling system's RAM (or ROM in the case of BIOS 420). In one embodiment, when a component is not in use, such as one of the virtual machines, the component is sealed. In the case of a virtual machine, when not in use the virtual machine, and the virtual machine's virtual TPM, would be sealed to the hypervisor.

Figure 5:
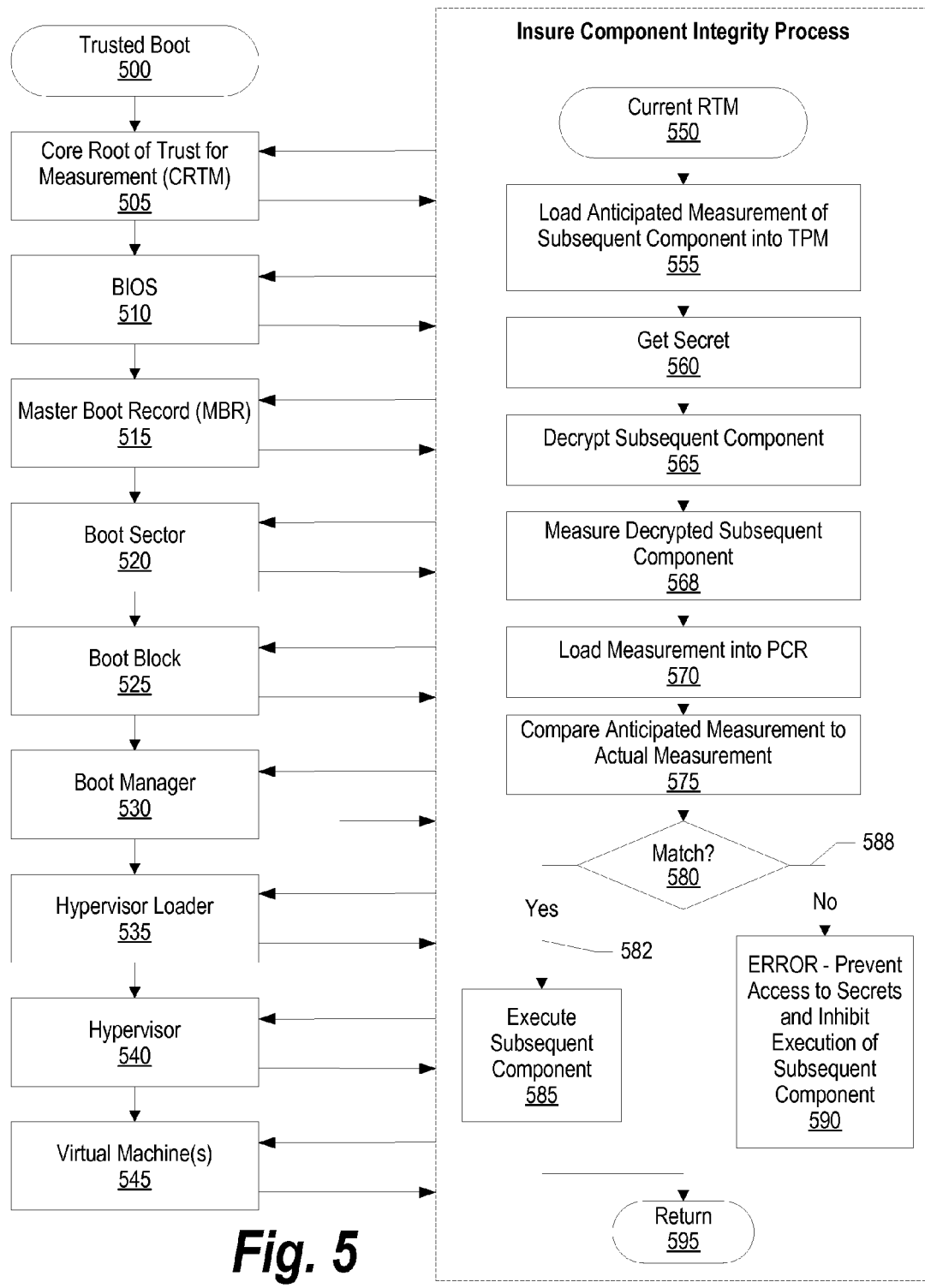
FIG. 5 is a flowchart showing a trusted boot process that boots a computer system including the system's BIOS, the hypervisor, and one or more virtual machines.

FIG. 5 is a flowchart showing a trusted boot process that boots a computer system including the system's BIOS, the hypervisor, and one or more virtual machines. Processing commences at 500, such as when the information handling system is booted either with a reboot command or when the system is initially powered on. Starting with the Core Root of Trust Measurement (CRTM), the components shown are sequentially loaded. CRTM loads at step 505, followed by BIOS at step 510, the master boot record at step 515, the boot sector at step 520, the boot block at step 525, the boot manager at step 530, the hypervisor loader at step 535, the hypervisor at step 540, and the virtual machines that run under the hypervisor at step 545. The invention is not limited to the components shown nor is the invention limited to the particular order of the components shown in FIG. 5.

After each component loads, a trust measurement is taken using the routine shown starting at 550. The trust measurement is used to decide whether the next component in the chain is trusted and can therefore be executed. Starting with the current root of trust measurement (RTM), each component runs steps 555 to 595 to determine whether the next component in the chain can be trusted and executed. At step 555, the anticipated measurement of the subsequent component is loaded into the TPM. At step 560 the TPM gets a secret, such as an encryption key, and at step 565, the TPM decrypts the subsequent component. For example, when the CRTM is operating (step 505), the subsequent component that is loaded and measured is the BIOS (step 510). At step 568, the TPM measures the decrypted subsequent component. One approach to measuring the component is by using a hash function, such as the SHA-1 function. At step 570, the measurement that was taken is loaded into a PCR. At step 575, the anticipated measurement value is then compared to the actual measurement value. A determination is made as to whether the anticipated measurement value matches the actual measurement value (decision 580). If the two values match, then decision 580 branches to "yes" branch 582 whereupon, at step 585 the subsequent component is executed (using the example from above, the BIOS would execute). On the other hand, if the two values do not match (indicating that the loaded code may have been altered or that the system has been started in an untrusted state), then decision 580 branches to "no" branch 588 whereupon, at step 590, an error occurs whereby the subsequent component is not executed. Processing then returns at 595 in order to load and measure the next subsequent component. This processing continues until all of the components (steps 505 to 545) have been loaded or until an error occurs indicating that the system is in an untrusted state (whereby further subsequent components are not loaded and executed).

Figure 6:
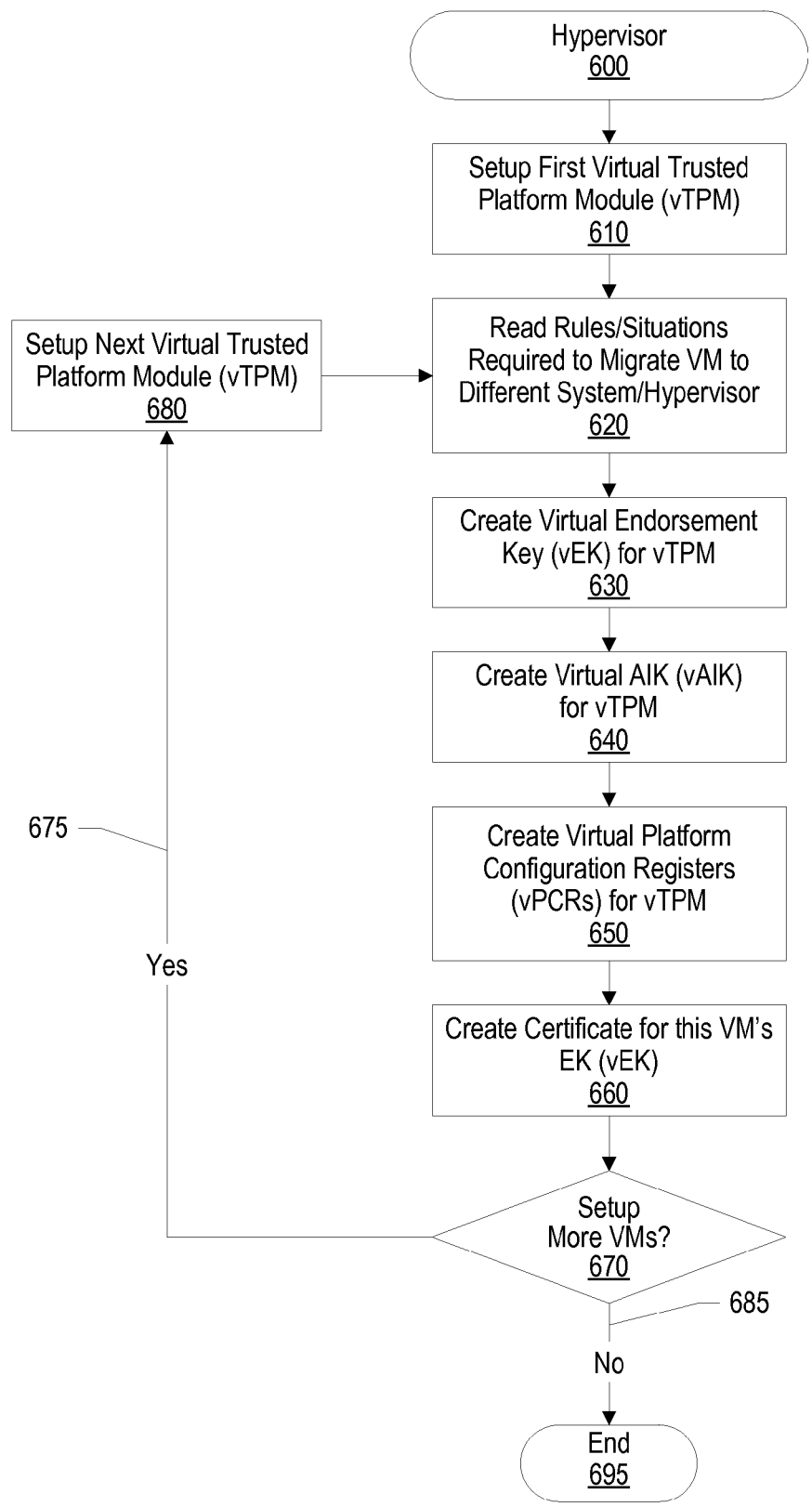
FIG. 6 is a flowchart showing steps taken by the hypervisor to set up the vTPMs for the various virtual machines running under the hypervisor.

FIG. 6 is a flowchart showing steps taken by the hypervisor to set up the vTPMs for the various virtual machines running under the hypervisor. Hypervisor processing commences at 600 whereupon, at step 610, the hypervisor starts setting up the first virtual trusted platform module (vTPM) that will be used by the first virtual machine that is running under the hypervisor. At step 620, the hypervisor reads rules/situations under which this virtual machine can be migrated to another system or hypervisor. In one embodiment, the rules are anticipated state (PCR) values that are loaded in the hardware based TPM. In another embodiment, the anticipated PCR values are maintained in the vTPM that corresponds to this virtual machine.

At step 630, a virtual endorsement key (vEK) is created for this virtual machine and stored in the virtual machine's virtual TPM (vTPM). The vEK is used by this virtual machine's virtual TPM to bind data. Like the Endorsement Key, the vEK is a key pair that includes a public key (vEKpu) and a private key (vEKpr). The vEK is used to recognize a genuine virtual TPM and is used to decrypt data sent to the vTPM.

At step 640, the hypervisor creates a virtual AIK (vAIK). The vAIK is an identity similar to the TPM's AIK. The vAIK is a special purpose signature key that is created by the virtual TPM being simulated by the hypervisor. The vAIK is an asymmetric key. The private portion of the key is non-migratable and protected by the vTPM. The public portion of an vAIK is part of a vAIK Credential. In one embodiment, an vAIK is only created by the TPM Owner or a delegate authorized by the TPM Owner. The vAIK can be used for virtual machine authentication, virtual machine attestation, and certification of keys used by the virtual machine. In one embodiment, the AIK key stored in the hardware-based TPM is locked to PCR values of the hardware-based TPM that correspond to the hypervisor. The PCR values include trust values that indicate that the corresponding hypervisor will not misuse the AIK key to "quote" something other than a correct vEK certificate. As known by those skilled in the art, a "quote" is a special command in a TPM in which an AIK is used to sign both PCR values and a 20 byte piece of data (the size of a hash). The result of executing the "quote" command is an association between the AIK and the PCRs. In one embodiment, the vAIK is locked to the hardware-based PCRs, and in an alternate embodiment, the vAIK is locked to the virtual PCRs (vPCRs).

At step 650, the hypervisor creates virtual platform configuration registers (vPCRs) used by the virtual machine's vTPM. The vPCR is used to store a digest of integrity digests used by the virtual machine. For example, digests stored in the vPCRs are updated when the virtual machine loads applications that run in the virtual machine environment. In this manner, since each virtual machine can load different applications, the vPCRs stored in each virtual machine's vTPM can be different from each other.

At step 660, the hypervisor creates a certificate for this virtual machine's virtual Endorsement Key (vEK). This certificate includes the public virtual Endorsement Key (vEKpu) and asserts that the holder of the private virtual Endorsement Key (vEKpr) is this vTPM. In one embodiment, the certificate for the vEK is generated using an AIK key of the hardware-based TPM to Quote the vTPM values and use (instead of the normal nonce value), the hash of the vEK certificate public text. That public text would also indicate under what circumstances the hypervisor will agree to instantiate the corresponding virtual machine and under what conditions the hypervisor would allow migration of the virtual machine to a different system. Like other certificates, the certificate created for the vEK is a static certificate that persists during the life of the vEK. When migrated, the certificate is transferred to the other system along with the vEK.

The hypervisor stores the migration rules, virtual endorsement key (vEK), virtual AIK, virtual PCRs, and the certificate for the vEK in storage accessible only by the hypervisor. In one embodiment, this privacy is maintained by the hypervisor using the hardware-based TPM to encrypt the virtual TPM data. Because the virtual machines do not have access to the hardware based TPM, only the hypervisor is able to retrieve the keys needed to decrypt the virtual TPM data.

A determination is made as to whether there are more virtual TPMs that need to be setup for additional virtual machines that operate under the hypervisor (decision 670). If there are additional virtual TPMs that need to be setup, decision 670 branches to "yes" branch 675 whereupon, at step 680, the next virtual TPM is setup and processing loops back to read this virtual machine's migration rules, create a virtual Endorsement Key (vEK) for this vTPM, create the vAIK for this vTPM, create the vPCRs for this vTPM, and create the certificate for the vEK. This looping continues until there are no more virtual machines that need to be setup, at which point decision 670 branches to "no" branch 685 and processing ends at 695.

Figure 7:
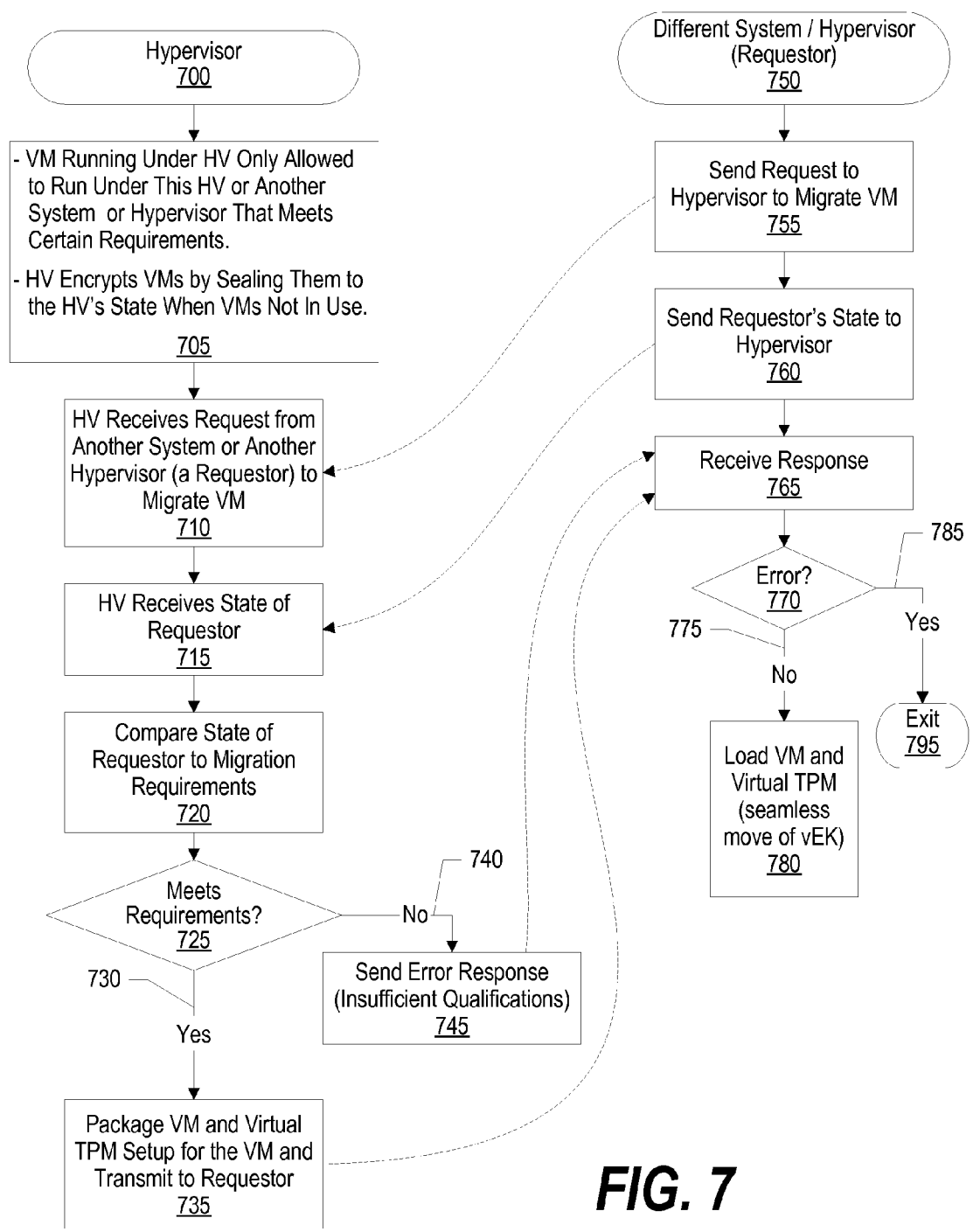
FIG. 7 is a flowchart showing steps taken to migrate a virtual environment, such as a virtual machine and the vTPM being used by the virtual machine, from one system (or hypervisor) to another system (or another hypervisor)

FIG. 7 is a flowchart showing steps taken to migrate a virtual environment, such as a virtual machine and the vTPM being used by the virtual machine, from one system (or hypervisor) to another system (or another hypervisor). For various reasons, virtual machines may be migrated. For example, in a distributed environment, if one information handling system is handling too many virtual machines one or more of the virtual machines can be migrated to another hypervisor, perhaps running on a different information handling system that has a lighter load.

Hypervisor processing is shown commencing at 700. Step 705 explains that virtual machines that are running under the hypervisor are only migrated to other systems, or hypervisors, that meet certain migration requirements. In one embodiment, these migration requirements/rules are stored in the PCRs (either the hardware based PCRs or the virtual PCR (the vPCRs) that are used by the virtual machine in question. Step 705 also explains that when a virtual machine is not in use it is encrypted. In one embodiment, this encryption is accomplished by having the hypervisor seal the virtual machine to the hypervisor's state.

As explained in FIG. 6, the public portion of the transferring system's Endorsement Key, such as the public portion of the virtual Endorsement Key (vEKpu) can be used to indicate the conditions under which the virtual machine can be migrated to other systems. Using this embodiment, the requesting system can evaluate the conditions by evaluating the public text (the vEKpu) prior to requesting migration of the virtual machine. The certificate created for the virtual Endorsement Key (vEK) in step 660 of FIG. 6 provides information as to where the vEK might be located. The certificate that was created for the virtual Endorsement Key is transferred from a hypervisor to another system using the steps shown in FIG. 7.

Migration processing commences at 710 when the hypervisor receives a request from another system (e.g., another hypervisor, another information handling system, etc.) to migrate a virtual machine that is running under the hypervisor. At step 715, the hypervisor receives the state of the requester (e.g., digest values). At step 720, the received state is compared to migration requirements stored in either the hardware based PCRs or the vTPM's virtual PCRs (vPCRs). A determination is made as to whether the requesting system meets the migration requirements (decision 725). If the requesting system meets the migration requirements, then decision 735 branches to "yes" branch 730 whereupon, at step 735, the virtual machine and the virtual machine's TPM (the vTPM) are packaged (encrypted) and transmitted to the requesting system. In one embodiment, the packaging is performed by using the public portion of the requesting system's Endorsement Key (EKpu). On the other hand, if the requesting system does not meet the migration requirements, then decision 725 branches to "no" branch 740 whereupon, at step 745 and error response is transmitted back to the requestor.

Requesting system processing is shown commencing at 750 whereupon, at step 755 a request is sent to a system (hypervisor) to migrate one of the hypervisor's virtual machines to the requestor. At step 760, the requester sends its current state to the hypervisor, and at step 765, the requester receives a response. A determination is made as to whether the response is an error (decision 770). If the response is an error, then decision 770 branches to "yes" branch 785 whereupon processing exits at 795 without migrating the virtual machine. On the other hand, if the request was successful, then decision 770 branches to "no" branch 775 whereupon, at step 780, the requesting system receives the packaged virtual machine and packaged virtual TPM. The requesting system then runs the virtual machine in its environment, including a seamless transfer of the virtual machine's virtual Endorsement Key (vEK).

Figure 8:
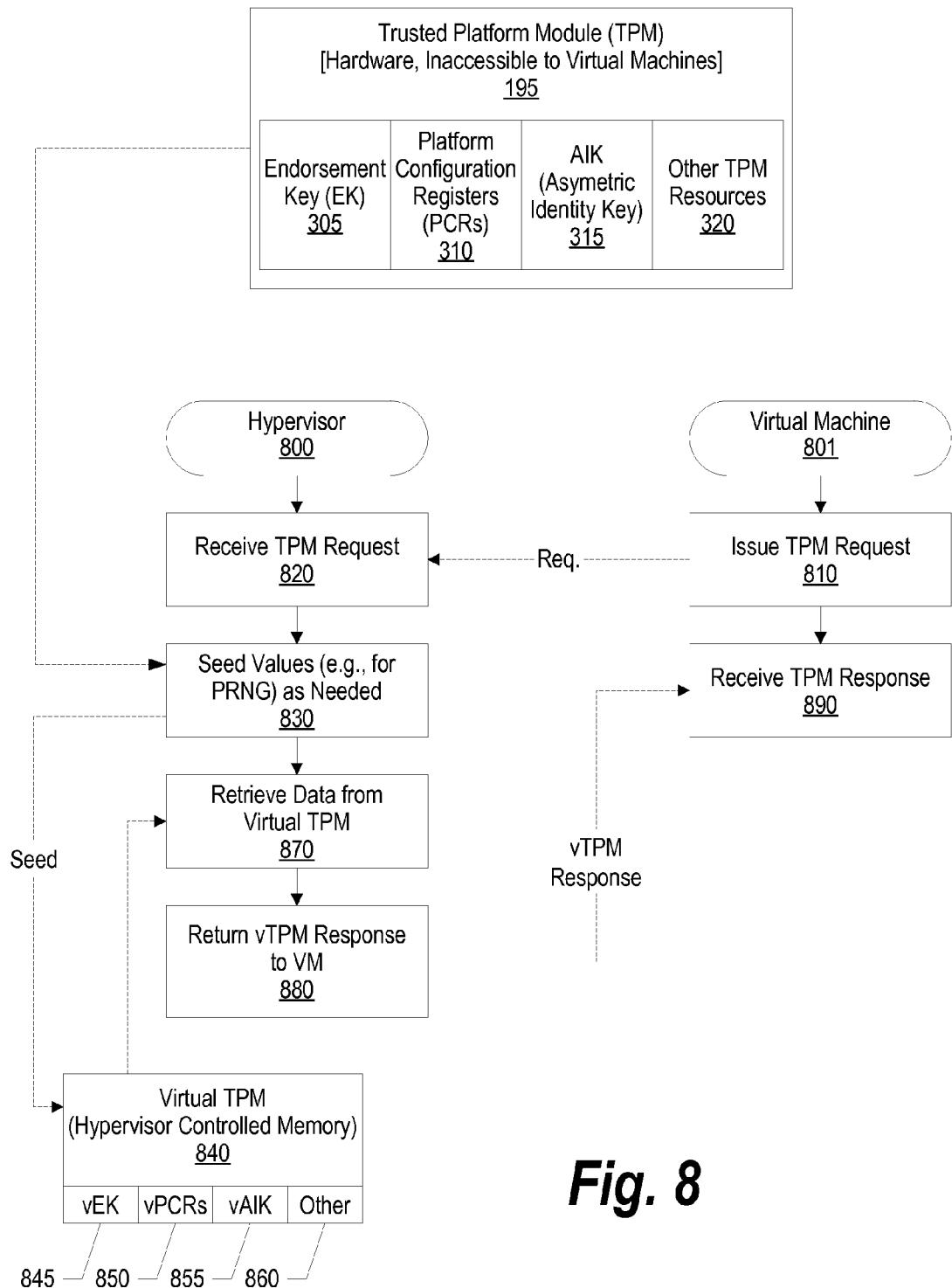
FIG. 8 is a flowchart showing steps taken by a hypervisor to provide emulated TPM functions for a virtual machine based upon TPM requests made by the virtual machine.

FIG. 8 is a flowchart showing steps taken by a hypervisor to provide emulated TPM functions for a virtual machine based upon TPM requests made by the virtual machine. Hypervisor processing is shown commencing at 800 and virtual machine processing is shown commencing at 801. At step 810, the virtual machine makes a TPM request. The hypervisor receives the TPM request at step 820. Because the virtual machine does not have access to hardware-based TPM 195, the hypervisor simulates the TPM using data stored in virtual TPM (vTPM) 880.

In order to simulate the TPM functions, the hypervisor may need to seed values used in providing the virtual TPM, such as a seed used by pseudo-random number generator (PRNG). At step 195, if a seed is needed, the hypervisor seeds the values using data provided by hardware-based TPM 195. As shown, vTPM 840 simulated by the hypervisor includes virtual Endorsement Key (vEK) 845, virtual PCRs (vPCRs) 850, virtual Asymmetric Identity Key (AIK) 855, and other virtual TPM data/functionality 860. At step 870, the hypervisor retrieves the requested TPM data from virtual TPM 840 and, at step 880, the hypervisor returns the TPM data to the requesting virtual machine. Returning to virtual machine processing, at step 890, the virtual machine receives the TPM data from the hypervisor.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   executing a start sequence of an information handling system that includes a hardware based trust platform module (TPM), wherein a plurality of platform configuration registers (PCRs) stored in the TPM are initialized to a predetermined state when the start sequence commences;
   during the execution of the start sequence, loading one or more software modules in a memory of the information handling system, wherein one of the software modules is a hypervisor;
   calculating one or more PCR values resulting from the loading of the hypervisor;
   comparing the calculated PCR values that resulted from the loading of the hypervisor with one or more expected PCR values, the comparison indicating whether the loading of the hypervisor places the information handling system in a trusted state;
   in response to the comparison revealing that the calculated PCR values that resulted from the loading of the hypervisor match the expected PCR values, indicating that the information handling system is in the trusted state, creating a virtual environment under the hypervisor, wherein the creation of the virtual environment includes loading a virtual machine and creating a virtual trust platform module (vTPM) used by the virtual machine; and
   in response to the comparison revealing that the calculated PCR values that resulted from the loading of the hypervisor do not match the expected PCR values, indicating that the information handling system is in an untrusted state, inhibiting the creation of the virtual environment.

2. The method of claim 1, wherein the creation of the virtual trust platform module further comprises:
   calculating one or more additional PCR values resulting from the loading of the virtual machine; and
   storing the additional PCR values in one or more virtual platform configuration registers that are included in the virtual trust platform module.

3. The method of claim 2, wherein the loading of the virtual machine further comprises:
   comparing the additional PCR values that resulted from the loading of the virtual machine with one or more additional expected PCR values;
   in response to the comparison revealing that the additional PCR values that resulted from the loading of the virtual machine match the expected additional PCR values, executing the virtual machine; and
   in response to the comparison revealing that the additional PCR values that resulted from the loading of the virtual machine do not match the expected additional PCR values, inhibiting the execution of the virtual machine.

4. The method of claim 1, wherein the creation of the virtual trust platform module (vTPM) further comprises:
- calculating, by the hypervisor, a virtual endorsement key (vEK), one or more virtual platform configuration registers (vPCRs), and a virtual Asymmetric Identity Key (vAIK) corresponding to the virtual machine; and
- storing the vEK, vPCRs, and the vAIK in the virtual trust platform module.

5. The method of claim 1, further comprising:
- executing the virtual machine;
- during execution of the virtual machine, receiving, at the hypervisor, a TPM request from the virtual machine;
- retrieving, by the hypervisor, data from the virtual trust management platform (vTPM) corresponding to the TPM request; and
- returning the data retrieved from the vTPM to the virtual machine.

6. The method of claim 5, further comprising:
- emulating, by the hypervisor, a TPM function corresponding to the received TPM request, the emulating resulting in the data that is returned to the virtual machine.

7. The method of claim 1, wherein the creation of the virtual environment includes storing one or more migration rules corresponding to the virtual machine, and the method further comprises:
- receiving, at the hypervisor, a request to migrate the virtual machine to a second system environment;
- comparing a state received from the second system environment with the one or more migration rules;
- in response to the comparing revealing that the state satisfies the migration rules;
  - packaging the virtual environment, including the virtual machine and the virtual trust management platform (vTPM); and
  - transmitting the packaged virtual environment to the second system environment; and
- in response to the comparing revealing that the state does not satisfy the migration rules, inhibiting the packaging and the transmitting of the virtual environment.

8. An information handling system comprising:
- one or more processors;
- a memory accessible by at least one of the processors;
- a nonvolatile storage area accessible by at least one of the processors;
- a hardware-based trust management platform (TPM) accessible by at least one of the processors, the TPM including a plurality of platform configuration registers (PCRs) that are initialized to a predetermined state;
- a set of instructions executed by the hypervisor, wherein one or more of the processors executes the set of instructions in order to perform actions of:
  - executing a start sequence that results in loading one or more software modules in the memory, wherein one of the software modules is a hypervisor;
  - calculating one or more PCR values resulting from the loading of the hypervisor;
  - comparing the calculated PCR values that resulted from the loading of the hypervisor with one or more expected PCR values, the comparison indicating whether the loading of the hypervisor places the information handling system in a trusted state;
  - in response to the comparison revealing that the calculated PCR values that resulted from the loading of the hypervisor match the expected PCR values, indicating that the information handling system is in the trusted state, creating, in the memory, a virtual environment under the hypervisor, wherein the creation of the virtual environment includes loading a virtual machine and creating a virtual trust platform module (vTPM) used by the virtual machine; and
  - in response to the comparison revealing that the PCR values that resulted from the loading of the hypervisor do not match the expected PCR values, indicating that the information handling system is in an untrusted state, inhibiting the creation of the virtual environment.

9. The information handling system of claim 8, wherein the creation of the virtual trust platform module further comprises actions of:
- calculating one or more additional PCR values resulting from the loading of the virtual machine; and
- storing the additional PCR values in one or more virtual platform configuration registers that are included in the virtual trust platform module (vTPM) that is stored in the memory.

10. The information handling system of claim 9, wherein the loading of the virtual machine further comprises actions of:
- comparing the additional PCR values that resulted from the loading of the virtual machine with one or more additional expected PCR values;
- in response to the comparison revealing that the additional PCR values that resulted from the loading of the virtual machine match the expected additional PCR values, executing the virtual machine by at least one of the processors; and
- in response to the comparison revealing that the additional PCR values that resulted from the loading of the virtual machine do not match the expected additional PCR values, inhibiting the execution of the virtual machine by the processors.

11. The information handling system of claim 8, further comprising actions of:
- executing the virtual machine by one of the processors;
- during execution of the virtual machine, receiving, at the hypervisor, a TPM request from the virtual machine that is also being executed by one of the processors;
- retrieving, by the hypervisor, data from the virtual trust management platform (vTPM) corresponding to the TPM request; and
- returning the data retrieved from the vTPM to the virtual machine.

12. The information handling system of claim 8, further comprising actions of:
- emulating, by the hypervisor executing on one of the processors, a TPM function corresponding to the received TPM request, the emulating resulting in the data that is returned to the virtual machine.

13. The information handling system of claim 8, wherein the creation of the virtual environment includes storing one or more migration rules corresponding to the virtual machine in the memory wherein the set of instructions perform further actions comprising:
- receiving, at the hypervisor, a request to migrate the virtual machine to a second system environment;
- comparing a state received from the second system with the one or more migration rules;
- in response to the comparing revealing that the state satisfies the migration rules:
  - packaging the virtual environment, including the virtual machine and the virtual trust management platform (vTPM); and
  - transmitting the packaged virtual environment to the second system environment; and in response to the comparing revealing that the state does not satisfy the migration rules, inhibiting the packaging and the transmitting of the virtual environment.

14. A computer program product stored in a non-transitory computer readable medium, comprising functional descriptive material that, when executed by an information handling system, causes the information handling system to perform actions that include:
- executing a start sequence of an information handling system that includes a hardware based trust platform module (TPM), wherein a plurality of platform configuration registers (PCRs) stored in the TPM are initialized to a predetermined state when the start sequence commences;
- during the execution of the start sequence, loading one or more software modules in a memory of the information handling system, wherein one of the software modules is a hypervisor;
- calculating one or more PCR values resulting from the loading of the hypervisor;
- comparing the calculated PCR values that resulted from the loading of the hypervisor with one or more expected PCR values, the comparison indicating whether the loading of the hypervisor places the information handling system in a trusted state;
- in response to the comparison revealing that the calculated PCR values that resulted from the loading of the hypervisor match the expected PCR values, indicating that the information handling system is in the trusted state, creating a virtual environment under the hypervisor, wherein the creation of the virtual environment includes loading a virtual machine and creating a virtual trust platform module (vTPM) used by the virtual machine; and
- in response to the comparison revealing that the calculated PCR values that resulted from the loading of the hypervisor do not match the expected PCR values, indicating that the information handling system is in an untrusted state, inhibiting the creation of the virtual environment.

15. The computer program product of claim 14, wherein the creation of the virtual trust platform module further comprises functional descriptive material that causes the data processing system to perform additional actions of:
- calculating one or more additional PCR values resulting from the loading of the virtual machine; and
- storing the additional PCR values in one or more virtual platform configuration registers that are included in the virtual trust platform module.

16. The computer program product of claim 15, wherein the loading of the virtual machine further comprises functional descriptive material that causes the data processing system to perform additional actions of:
- comparing the additional PCR values that resulted from the loading of the virtual machine with one or more additional expected PCR values;
- in response to the comparison revealing that the additional PCR values that resulted from the loading of the virtual machine match the expected additional PCR values, executing the virtual machine; and
- in response to the comparison revealing that the additional PCR values that resulted from the loading of the virtual machine do not match the expected additional PCR values, inhibiting the execution of the virtual machine.

17. The computer program product of claim 14, wherein the creation of the virtual trust platform module (vTPM) further comprises functional descriptive material that causes the data processing system to perform additional actions of:
- calculating, by the hypervisor, a virtual endorsement key (vEK), one or more virtual platform configuration registers (vPCRs), and a virtual Asymmetric Identity Key (vAIK) corresponding to the virtual machine; and
- storing the vEK, vPCRs, and the vAIK in the virtual trust platform module.

18. The computer program product of claim 14, further comprising functional descriptive material that causes the data processing system to perform additional actions of:
- executing the virtual machine;
- during execution of the virtual machine, receiving, at the hypervisor, a TPM request from the virtual machine;
- retrieving, by the hypervisor, data from the virtual trust management platform (vTPM) corresponding to the TPM request; and
- returning the data retrieved from the vTPM to the virtual machine.

19. The computer program product of claim 18, further comprising functional descriptive material that causes the data processing system to perform additional actions of:
- emulating, by the hypervisor, a TPM function corresponding to the received TPM request, the emulating resulting in the data that is returned to the virtual machine.

20. The computer program product of claim 14, wherein the creation of the virtual environment includes storing one or more migration rules corresponding to the virtual machine, and the functional descriptive material causes the data processing system to perform additional actions of:
- receiving, at the hypervisor, a request to migrate the virtual machine to a second system environment;
- comparing a state received from the second system environment with the one or more migration rules;
- in response to the comparing revealing that the state satisfies the migration rules:
  - packaging the virtual environment, including the virtual machine and the virtual trust management platform (vTPM); and
  - transmitting the packaged virtual environment to the second system environment; and
- in response to the comparing revealing that the state does not satisfy the migration rules, inhibiting the packaging and the transmitting of the virtual environment.

* * * * *